March 19, 1957 G. F. WEISS 2,785,868
ANGLING DEVICE
Filed Aug. 2, 1954 2 Sheets-Sheet 1
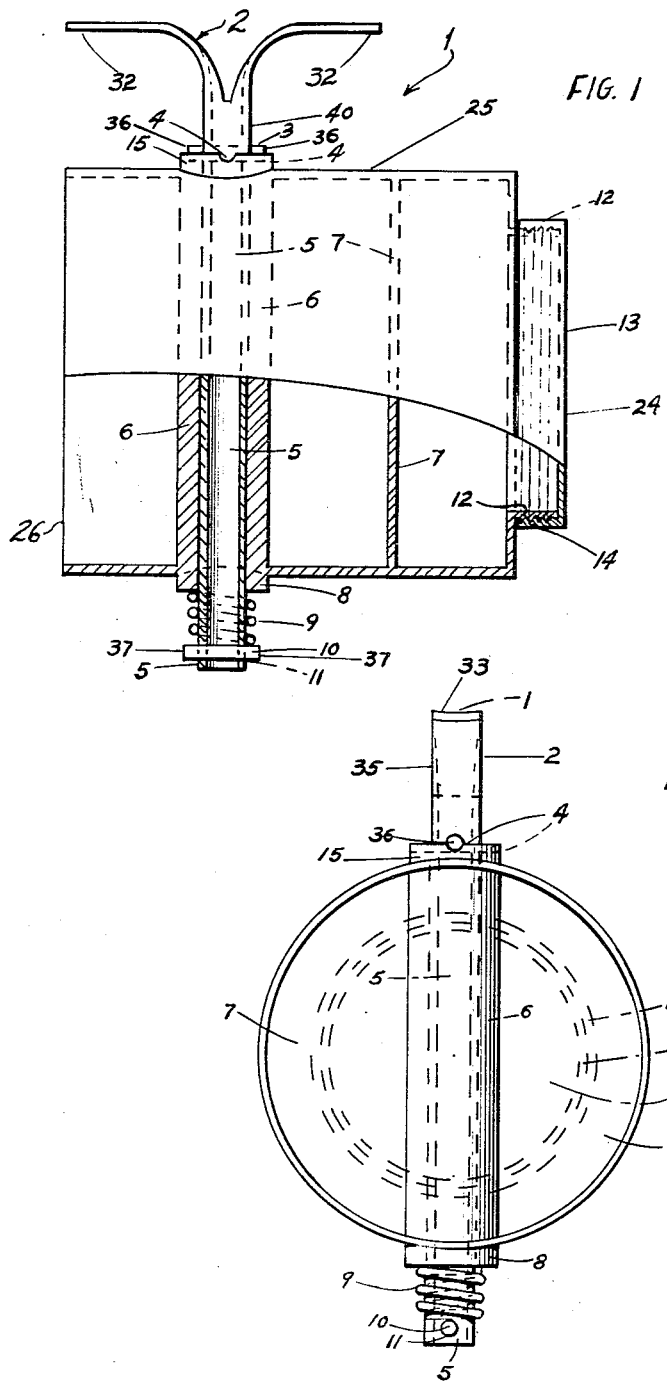
INVENTOR.
GILBERT F. WEISS
BY 
ATTORNEY March 19, 1957 G. F. WEISS 2,785,868
ANGLING DEVICE
Filed Aug. 2, 1954 2 Sheets-Sheet 2

INVENTOR.
GILBERT F. WEISS
BY
ATTORNEY

United States Patent Office 2,785,868
Patented Mar. 19, 1957

2,785,868

ANGLING DEVICE

Gilbert F. Weiss, Columbia, Mo.

Application August 2, 1954, Serial No. 447,367

5 Claims. (Cl. 242—84.1)

This invention has to do with a fishing reel.

One of the objects of this invention is to provide a reel which is simple to manufacture, cheap, rugged, and efficient.

Other objects will occur to fishermen, in the light of the following description and the accompanying drawings.

The fishing reel of this invention is designed to be mounted on a fishing rod. To that end, it is provided with a bracket which carries a post extending at right angles from the rod. A hollow drum is pivoted on the post, which extends diametrically through the drum. The drum is fixed against rotation about its central axis but can be rotated by hand about the post.

The drum is preferably open at at least one end, and is sufficiently large to permit the fingers of one hand easily to be inserted in the open end.

The drum may be open at both ends and equipped with a false bottom and a removable closure on one end so as to provide a container in which to store bait, fishing gear or the like.

The drum is preferably provided with a detent which tends to hold the drum in two positions in which the axis of the drum is parallel with the axis of the fishing rod and in two positions in which the axis of the drum is at right angles to the axis of the fishing rod.

In the drawing,

Figure 1 is a view in side elevation, partly cut away, of a fishing reel constructed in accordance with one embodiment of this invention;

Figure 2 is a view in rear elevation of the reel shown in Figure 1;

Figure 3:
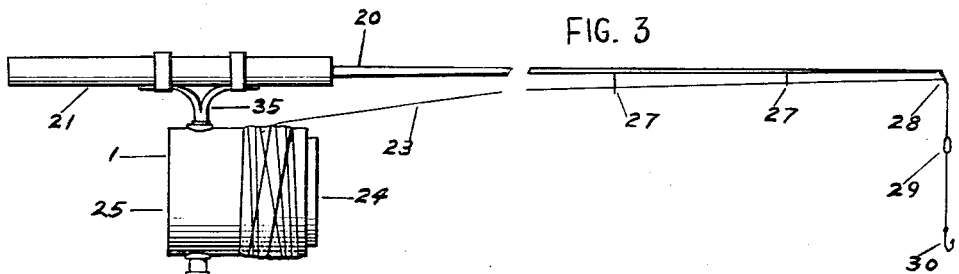
Figure 3 is a view in side elevation showing the reel of this invention mounted on a fishing rod with the reel drum in casting position.
Figure 4:
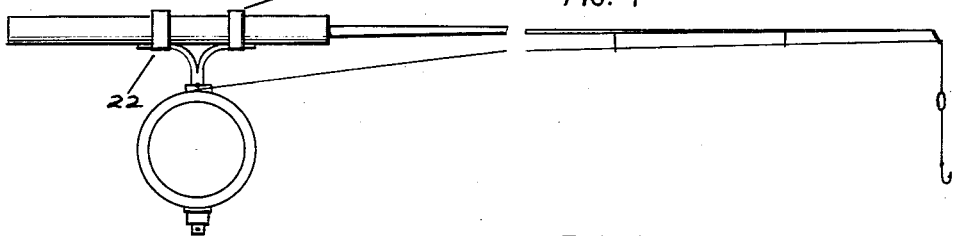
Figure 4 is a view similar to that shown in Figure 3, showing the drum turned to right-handed reeling position.
Figure 5:
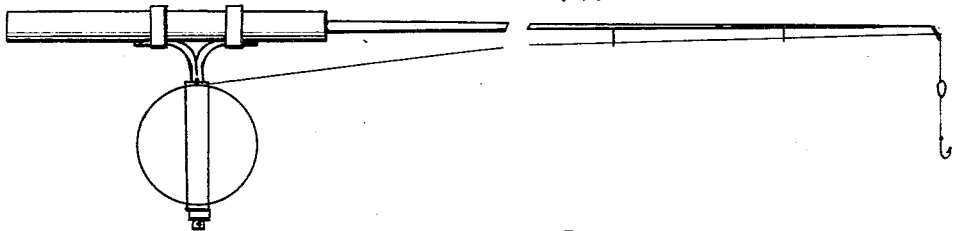
Figure 5 is a view similar to that shown in Figure 3, showing the drum turned to left-handed reeling position.
Figure 6:
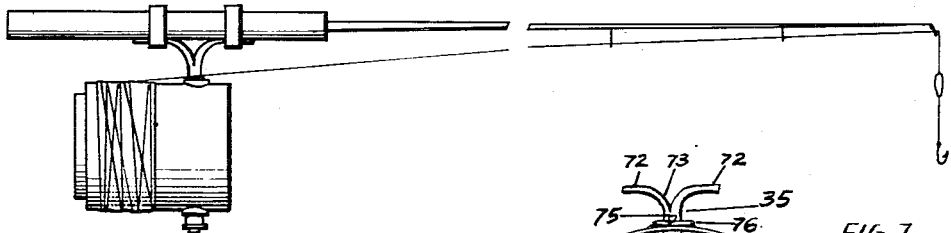
Figure 6 is a view similar to that shown in Figure 3, showing the drum turned to set position, in which the line is locked.

Referring to Figures 3 through 6 of the drawings, reference numeral 1 indicates a reel of this invention which is mounted on a handle 21 of a fishing rod 20 by means of bands 22 such as are commonly found on spinning rods. The reel includes a mounting bracket 35 and a drum 25. A line 23 is wound around one end 24 of the drum 25.

As is usual in casting rods, the line 23 extends through guides 27 and a tip 28. In the drawing, the free end of the line is shown as being equipped with a simple sinker 29 and a hook 30. However, it is to be understood that any desired kind of lure, weight, bait or contrivance weighing from about one-sixteenth of an ounce to three or four ounces may be used.

In the illustrative embodiment of this invention shown in Figures 1 and 2, the mounting bracket 35 is made up of a saddle 2, having a pair of oppositely directed arms 32, and a post 40, extending at right angles to the arms 32. The arms 32 each have a concave face 33 to fit the round handle 21 of the rod 20.

A stop pin 3 extends through the post 40 near the saddle, with ends 36 projecting from either side of the post. Near the opposite end of the post 40, a retaining pin 10 extends through the post 40 with ends 37 projecting from either side of the post.

The drum 25 is mounted on the post 40 between the stop pin 3 and the retaining pin 10. The drum 25 is hollow and is open at one end 26. A sleeve 6 extends diametrically through and beyond the drum 25. In this embodiment, the sleeve 6 is made integral with the drum 25. At the saddle side of the drum 25, the sleeve 6, projecting from the drum 25, forms a stop pin boss 15. The stop pin boss 15 is notched in quadrants. The notches 4 are so positioned with respect to the stop pin 3, that, when the reel is mounted on the fishing rod 20, the drum 24 will be releasably detained in two positions at which the axis of the drum and of the fishing rod are parallel and in two positions at which the axis of the fishing rod and drum are at right angles.

At the retaining pin side of the drum 25, the sleeve 6, projecting from the drum 25, provides a spring boss 8. A helical compression spring 9, bearing at one end on the retaining pin 10 and at the other end on the boss 8, biases the sleeve 6 towards and against the stop pin 3.

A false bottom 7 is positioned in the drum 25 between the sleeve 6 and the end 24 over which the line 23 slips. The end 24 of the drum 25 has a circular opening 12 in it, around which is a threaded rim 14. A threaded cap 13 is removably screwed onto the rim 14, as shown in Figure 1, to serve as a closure.

The construction of a reel embodying this invention can be made even more simple than that shown in Figures 1 and 2. For example, a workable reel such as that shown in Figure 7, can be made from a No. 2½ tin can, two three-eighths inch washers, one three-eighths inch aluminum or brass pipe about nine inches long, and a tenpenny nail.

In making a reel from these materials, the pipe is slotted diametrically for about two inches from one end, with a hack saw or the like, and the two halves of slotted pipe are bent outwardly to form arms 72 of a saddle 73 of the bracket 35. A hole is drilled diametrically entirely through the pipe about one inch from the bottom of the slot. A stop pin 75, cut from the tenpenny nail, is driven through the hole, with ends about a quarter of an inch long projecting from either side of the pipe. Another hole is drilled at a distance along the pipe from the first hole approximately equal to the inside diameter of the can.

One end of the can is cut out cleanly. Three-eighths inch holes are made on diametrically opposite sides of the tin can somewhat nearer its open end than its closed end.

Figure 7:
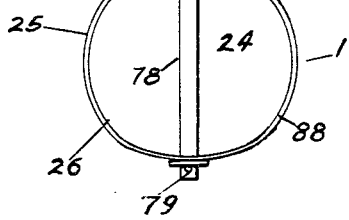
Figure 7 is a view in side elevation of a fishing reel constructed in accordance with another embodiment of this invention, with the reel drum in reeling position.

Two pairs of notches at right angles to one another are made with a file or hack saw in one flat surface of one of the washers. The notched washer is mounted on the outside of the tin can around one of the holes in the tin can to serve as a stop pin boss 76, with its notches so arranged that the projecting ends of the stop pin 75 rest in the notches when the can is turned in any of the directions shown in Figures 3 through 6. The washer may be secured to the tin can by soldering it as shown in Figure 7, or by drilling a hole through it and through the tin can and riveting the two together through the holes, or in any other suitable manner. The other washer may, but need not, be secured on the outside of the can around the other three-eighths inch hole. The can is then mounted on the post portion 78 of the pipe, to serve as the drum 25, in such a way that the notched washer 76 rests against the stop pin 75. If it has not been secured to the can, the other washer is slipped over the post. The wall of the can is then flexed inwardly sufficiently far to permit a pin made from the tenpenny nail to be driven through the second hole in the post to serve as a retaining pin 79. It can be seen that if the distance between the holes is the same as the inside diameter of the can, the flexure required will be approximately the sum of the thicknesses of the washers. More or less flexure may be used, depending upon the character of the tin can and the amount of resistance to turning desired. The resilience of the wall of the tin can will then serve to bias the notched washer 76 against its stop pin 75. In Figure 7, the amount of flexure is somewhat exaggerated.

Figure 8:
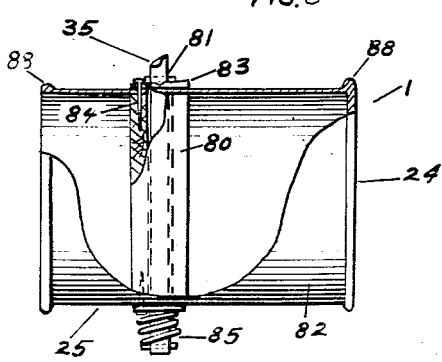
Figure 8 is a fragmentary view in side elevation, partly cut away, of a fishing reel constructed in accordance with still another embodiment of this invention.

A refinement over the embodiment shown in Figure 7, but still an easily made embodiment is shown in Figure 8. In the reel shown in that figure, a sleeve 80, made of a piece of wood with a three-eighths inch hole bored lengthwise in it, is mounted inside of a tin can drum 25. The wood sleeve fits slideably on a post 81 of the bracket 35. A notched washer stop boss 83 can be fastened to the can 82 simply by boring a hole in the washer and driving a nail 84 through it, through the wall of the can, and into the wooden sleeve. Since the wooden sleeve prevents inward flexure of the can, a compression spring 85 is used and a retaining pin 86 is driven through the post to hold the spring in position.

In those embodiments in which a tin can or the like is used as a drum, a small lip 88 is provided at either end of the drum. On the casting end 24 of the drum, this lip serves to aid in the braking process when the drum is turned through less than ninety degrees from the casting position.

The reel of this invention is mounted on a fishing rod in the same manner as reels of other types. When it is desired to cast, the reel is turned to the position shown in Figure 3 and the line is held with one finger until the cast is made. When the line is released, it slips readily from the drum over the end 24. The use of a reasonably large-size drum is preferred for several reasons. The line slips readily from a large-size drum, and heavy line may be used.

In reeling in the line, it is only necessary to turn the drum through 90° to the right if one is right-handed or to the left if one is left-handed, and wind the line around the drum. In order to lock the line against playing out, it is only necessary to turn the drum through 180° from the casting position, when the line bends around the post and is thereby prevented from playing out. In playing a fish one may grasp the post or the sleeve, as the case may be, through the open end of the drum and use his free hand on the line. By turning the drum through less than 90° from the casting position, the line can be made to play out with difficulty through approximately half of its travel about the drum. In this way, the reel can be used as a brake against which to play a fish.

The utility of the chamber in the end 24 will be apparent to any fisherman. It can be used for storing bait, hooks, leaders, extra line, or even medicinal spirits.

If the compartment is left empty, the air-tight chamber will serve to keep the reel afloat if it should be dropped into the water.

Numerous variations in the construction of the reel of this invention within the scope of the claims will be apparent to those skilled in the art in the light of the foregoing disclosure. For example, the drum may be made of plastic or wood, and may have various shapes, such as a hexagon, in cross section. The mounting bracket, too, may be made of various materials and in various forms to suit individual requirements. The saddle illustrated and described is suited for use with most of the fly, bait and spinning rods now in common use, but may also be modified for use with particular rods.

Having thus described the invention, what is claimed and desired to be secured by Letters Patent is:

1. A slip cast reel for use on a fishing rod, comprising a bracket having a post extending at right angles to the axis of said rod; a hollow drum having an open-ended sleeve extending diametrically across its interior, said sleeve being rotatably mounted on said post; drum-retaining means carried by said post exteriorly of said drum, and means positioned between said retaining means and said drum and exerting pressure on said drum to inhibit but not prevent manual rotation of said drum about said post.

2. A slip cast reel for mounting on a fishing rod, comprising a bracket having a saddle with a pair of arms extending in the direction of the axis of said rod and a post extending at right angles to said arms; a hollow drum slidably and pivotally mounted on said post, said post extending diametrically entirely through and projecting beyond said drum; a stop pin extending radially from said post between said drum and said saddle; a boss mounted for rotation with said drum and positioned between the drum and the stop pin, said boss having radial grooves complementary with said stop pin; and a spring, mounted on the projecting end of the post and biasing the entire drum toward, and the boss, against, said stop pin.

3. A slip cast reel for use on a fishing rod comprising a mounting bracket, said bracket having a post extending at right angles to the axis of said rod, and a cylindrical drum pivotally and diametrically mounted on said post for rotation through more than 90° about said post from a position at which the central axis of the drum is parallel with the axis of the rod, said drum being fixed against rotation about its central axis.

4. A slip cast reel for use on a fishing rod comprising a mounting bracket, said bracket having a post extending at right angles to the axis of said rod and a hollow cylindrical drum pivotally and diametrically mounted on said post for rotation about said post but fixed against rotation about its central axis, said drum being provided at one of its ends with a removable closure, and, intermediate said end and the post of the mounting bracket, with a false bottom.

5. The slip cast reel of claim 3 wherein the wall of the cylindrical drum is formed of resilient material, drum retaining means are provided on diametrically opposite ends of the post externally of the drum, and the wall of the drum is flexed inwardly between the drum retaining means so as to bear resiliently against them, inhibiting but not preventing manual rotation of the drum about said post.

References Cited in the file of this patent

UNITED STATES PATENTS

| 560,925 | Pfluger | May 26, 1896 |
| 1,516,522 | Farr | Nov. 25, 1924 |
| 2,047,705 | Porter | July 14, 1936 |
| 2,580,777 | Hewlett | Jan. 1, 1952 |
| 2,677,509 | Gage | May 4, 1954 |
| 2,697,564 | Haney et al. | Dec. 21, 1954 |

FOREIGN PATENTS

| 80,219 | Norway | Mar. 12, 1952 |
| 583,350 | Great Britain | Dec. 16, 1946 |